June 30, 1959 M. KESSLER 2,892,516
STRUCTURAL WINDOW PANEL
Filed Nov. 9, 1956
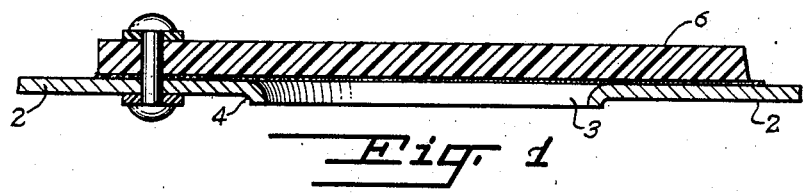
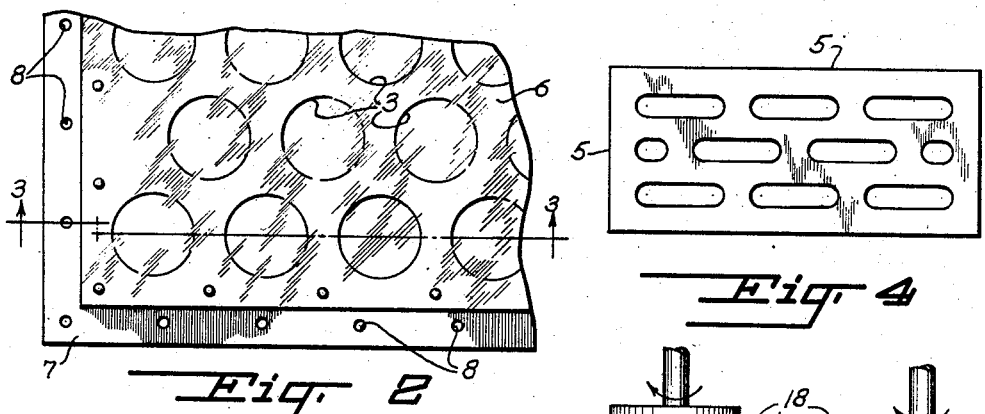
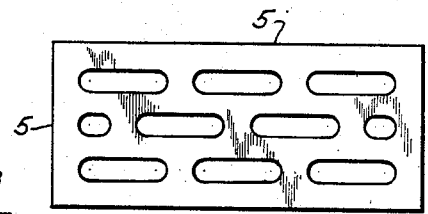
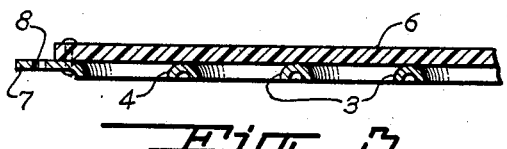
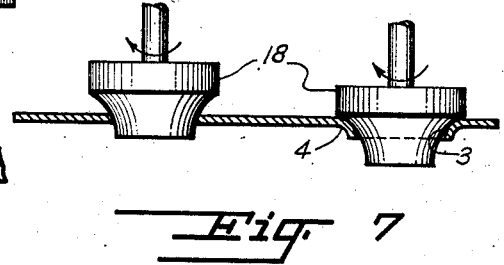
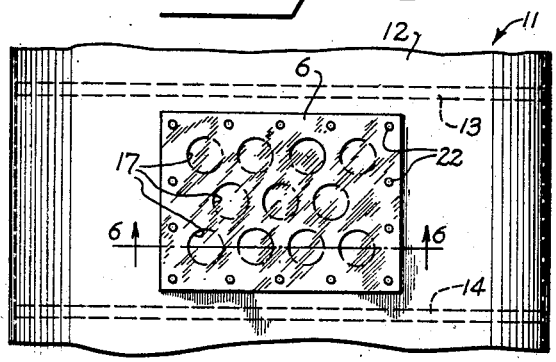
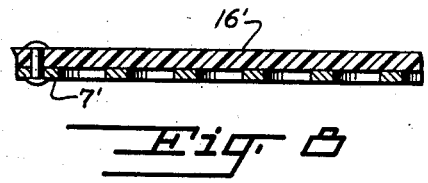
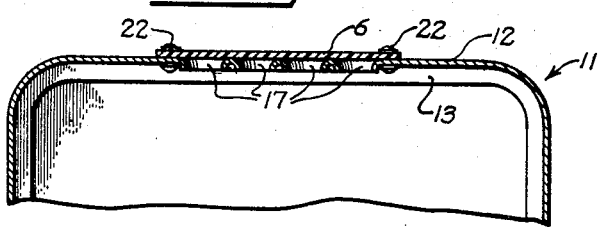
INVENTOR.
Milton Kessler
BY
Attorney United States Patent Office 2,892,516
Patented June 30, 1959

2,892,516
STRUCTURAL WINDOW PANEL
Milton Kessler, Youngstown, Ohio
Application November 9, 1956, Serial No. 621,309
7 Claims. (Cl. 189—64)

This invention relates to a light-transmitting panel primarily intended for use as a window or skylight, but which is adapted to any use where a lightweight, mechanically strong and rigid light-transmitting panel is required, and to a method of making same.

Many situations arise where there is a need for a light-transmitting panel or window which need not necessarily be transparent, but must be at least sufficiently translucent to pass a sufficient amount of light to illuminate an otherwise dark interior space. An example of this is a skylight, that is, a roof panel passing daylight into an interior; such skylights are usually made translucent in order to better diffuse the light transmitted into the interior. In many industrial interiors it is desired to provide large translucent wall areas for interior illumination without glare or the annoyance of direct sunlight which clear, transparent windows would pass. In modern large tractor trailers it has been found very desirable to provide some additional daylight illumination to that furnished by the rear doors of the trailer when they are opened, since such trailers are often so long that the foreward end is very inadequately illuminated by the rear door. It will be obvious that for most such industrial uses any skylight or translucent window should preferably be rugged, not easily broken, and serve as a strength member of construction element of the structure so as to add strength thereto, or at least not to weaken the same.

It is a primary object of the invention to provide a simple, but rugged and inexpensive means of illuminating such interiors.

Another object is to provide a method of installing a skylight or window in an existing sheet metal roof or wall without removing same or in any way weakening it, as the cutting of a window aperture would do.

The use of plastic sheets, and particularly of glass-fiber reinforced plastic sheets as light-transmitting members, is growing rapidly, but the mere substitution of such a sheet for a glass window pane, as is often done, does not meet the above noted objections, and fails to take advantage of the special qualities of such plastic sheets. It is accordingly an object of the invention to provide a light-transmitting panel using such plastic sheets so as to take full advantage of their characteristics and to provide a member having the mechanical strength and other physical characteristics of metal while having the light-transmitting qualities of the plastic sheet.

According to the invention, a flat plastic sheet having the desired light-transmitting characteristics is superimposed upon and rigidly fastened to a metal panel which has been perforated to provide a sufficient number of apertures so as to pass the desired amount of light. Preferably, the rim or edge of each aperture is rolled, pressed or spun out away from the side in contact with the plastic sheet, so that the upstanding rim thus formed provides greater resistance against bending or flexing than the same portion of the metal sheet previously had, and thus the sheet is actually more rigid than before. At the same time, the strength of the plastic sheet is added to that of the metal, and as such plastic sheets can be made very strong, the resulting structure is definitely stronger than before. Where the existing structure which is to be illuminated has a sheet metal wall, the invention can be applied to such wall without in any way disturbing the structure by perforating the wall in situ, rolling in the edges of the perforations and attaching a plastic panel over the so perforated area.

The specific nature of the invention, as well as other objects and advantages thereof, will clearly appear from a description of a preferred embodiment as shown in the accompanying drawing in which:

Fig. 1 is a sectional view of a panel showing the principle of the invention;

Fig. 2 is a plan view of a portion of a portable panel unit according to the invention;

Fig. 3 is a sectional view taken on line 3—3 of Fig. 2;

Fig. 4 is a plan view of another form of the invention;

Fig. 5 is a plan view of a trailer top embodying the invention;

Fig. 6 is a sectional view taken on line 6—6 of Fig. 5;

Fig. 7 is a sectional view of a perforated metal panel showing the manner of forming the flanged ridges; and Fig. 8 is a sectional view of a modified construction.

Figs. 1 and 2 show the basic concept of the invention. A flat metal sheet 2, which is typically of aluminum or iron, is provided with a number of circular perforations 3, the rims of which are turned out to form circular flanges as shown at 4. Due to the stiffening action of the upstanding rim or flange 4, it will be apparent that the metal sheet 2 can be made stiffer in the region of the apertured portion than it was originally, and will have more rigidity against bending or flexing than it previously had without the apertures, provided the rim 4 is made sufficiently deep. By providing a series of such apertures, as shown in Figs. 2 and 3, and properly staggering them, the panel can be given additional stiffness in any particular direction. Fig. 4 shows by way of example a configuration of elongated slots in staggered relation which will give additional rigidity in the longitudinal direction of the narrow panel 5 against bending, someway analogous to the rigidity of the well-known structural T-beam. It will be apparent that many other configurations are possible which will give added rigidity in some or other directions, but for the present purpose it is preferred to employ a series of circular apertures placed in staggered relation as shown in Fig. 2 because of the simplicity and economy of making such apertures.

On the side of sheet 2 away from the rims 4, that is to say, on the flat side, is fastened a sheet 6 of plastic panelling. This sheet may be transparent if desired, but for most purposes to which this composite panel is adapted, it is preferred to use a translucent, light-diffusing material. A very suitable material for this purpose is a sheet of polyester reinforced with glass fibers imbedded therein, such as is commonly available under the trademark "Fiberglas." Plastic sheet 6 may be fastened in any suitable manner, for example, by applying a layer of waterproof cement at the edges and by using a series of rivets along the edges, or cement alone may be sufficient. Many waterproof cements are available for this purpose.

Where the invention is in the form of a single panel as above described, the sheet metal preferably protrudes at all edges, as shown at 7 in Fig. 2, and may be provided with suitable apertures 8 along the rim for fastening into any structural opening, or to any suitable frame where a portable framed unit is desired.

It will be seen that a lightweight, strong and rigid panel is provided. The apertures may be made sufficiently large and closely spaced so that 90 percent of the light will go through the openings as compared with the plastic sheet alone, and yet the strength will be even greater than that of the unperforated metal sheet alone, due to the ribbed protrusions and to the additional strength of the plastic sheet 6, which is very considerable.

In the case of single panels such as above described, mass production methods of manufacture are applicable, that is, the panel may be made on an assembly line basis using large presses and dies to form the apertures and assembling the plastic panel to the sheet metal with suitable plastic adhesive under heat and pressure to produce a permanently and completely bonded unitary structure. However, there are many situations where it is desired to install a skylight or wall light in an existing metal-walled structure, to which the invention is also particularly applicable. Such a situation often arises, for example, in the case of truck trailers for industrial haulage, as well as in metal box cars used to haul freight on railroads. Most of these structures have been made in the past without any source of daylight except for their doors, and it is often found that this does not provide adequate illumination in the remote end or ends of such vehicles. It is therefore becoming increasingly common to cut windows or skylights into the metal walls of such vehicles, which by present standard procedures is an expensive and time-consuming process, requiring skilled workmen, and using expensive windows or skylights of standard known construction and design. It will be understood that in the typical situation it is not necessary to produce a high level of illumination, but only to provide enough light to dispel the gloom of deep interiors. Since the majority of such vehicles have walls of sheet metal, using either iron or aluminum, with fairly large clear areas of metal supported by underlying ribs or frame structures spaced from one to several feet apart, it is possible to form a light transmitting window according to the above-described construction directly in situ, as will be described in connection with Figs. 5–7, which show the method of applying the invention to existing structures.

Figs. 5 and 6 show respectively a plan view of a section of a typical truck trailer top 11, typically made of an aluminum skin 12 supported by spaced transverse ribs 13, 14, a series of which extend along the length of the trailer and are suitably fastened to the body or chassis thereof, and which are welded, riveted or otherwise fastened to the skin 12. A clear sheet metal area is thus available between any two ribs such as 13 and 14, which area can be used to form a skylight 16 according to the invention. The procedure is as follows: A series of circular holes 17, suitably spaced, is cut into the thin metal skin 12, which may be readily and quickly done with an electric drill provided with a circle cutter. These holes are smaller than the final aperture, and a spinning tool 18 as shown in Fig. 7, which tool may also be driven by a standard portable electric drill is inserted into each aperture 17 and operated to spin the edge 19 down as shown in Fig. 7 until a predetermined suitable depth of rim 19 is formed.

After each hole has been properly formed, a sheet 21 of plastic is laid over the entire area covered by the holes, waterproof cement being first applied to at least the four edges and preferably over the entire metal area covered by the sheet, and the sheet 21 fastened to the metal skin 12 in any suitable manner, preferably by the use of rivets 22 passing through holes drilled in the plastic and metal sheet, neoprene washers being used with the rivets to insure water-tightness. For some applications it may be sufficient to use cement alone to fasten the sheet 21 to the skin 12, but for heavy industrial duty the use of rivets, bolts or nuts, or some similar mechanical fastening is preferred.

It will thus be seen that a method is provided for rapidly installing a skylight according to the invention directly on a metal roof, using inexpensive materials and relatively unskilled labor to produce a lightweight construction which is stronger than the original structure and which cannot be easily damaged. When installed in a trailer, it will be placed several feet back from the front end, and one such light will generally be adequate to provide the needed illumination. The same construction can be applied to box cars, in which case one or two skylights will be placed near each end, as the doors are usually in the center of such cars.

The same construction can also be provided in any fixed industrial building having sheet metal walls. In the case of corrugated sheet construction, the same procedure and design can be followed, using corrugated plastic sheeting or the same configuration as the corrugated metal, except that in this case, the inwardly-turned bead can often be dispensed with, as the corrugated structure usually provides sufficient strength if the holes are placed sufficiently far apart.

Where the structure is in the process of construction, it will be less expensive to use preformed panels as shown in Fig. 2, built in as part of the structure in order to achieve the desired result, but in either case the main advantages of the invention can be obtained.

Fig. 8 is a sectional view of a window panel similar to that of Fig. 3, except that the upstanding rims are omitted. This possesses all of the advantages of the form shown in Fig. 3 except that it is not as strong, and can be used in situations where the extra strength is not needed. It should be noted that due to the extra strength furnished to metal panel 7' by the plastic sheet 16', the resultant structure is still stronger than either member alone, and will in many cases be entirely adequate for all practical purposes.

It will be apparent that the embodiments shown are only exemplary and that various modifications can be made in construction and arrangement within the scope of my invention as defined in the appended claims.

I claim:

1. A light-transmitting structural panel comprising a sheet metal panel portion having a substantial structural surface area of sheet metal including therein at least one perforation for admitting light, and a light-transmitting plastic panel portion superposed upon and firmly fastened to one side of said metal portion in contact with at least a major portion of said structural area and sealing said perforation in water-tight relationship thereto.

2. The invention according to claim 1, said perforation having a turned out rim extending out of the plane of the metal panel portion.

3. The invention according to claim 2, said perforation being circular in shape.

4. The invention according to claim 3, said plastic portion being a sheet of translucent, fiber-reinforced plastic material.

5. A light-transmitting structural exterior panel comprising a rigid metal sheet having a plurality of spaced light-admitting perforations with substantial areas of metal surface between them, and a light-transmitting plastic panel superposed upon and firmly cemented to said metal sheet in water-tight relation and covering said perforations to produce a rigid composite sheet, said metal sheet extending beyond said plastic panel in all directions.

6. The invention according to claim 5, each of said perforations having an outwardly-turned rim extending out of the plane of the metal sheet in a direction away from the plastic panel.

7. The invention according to claim 6, said plastic panel being a sheet of translucent, fiber-reinforced plastic material.

References Cited in the file of this patent

UNITED STATES PATENTS

| 791,017 | Farmer | May 30, 1905 |
| 2,130,811 | Nelson | Sept. 20, 1938 |

FOREIGN PATENTS

| 507,957 | Great Britain | June 23, 1939 |
| 699,355 | Great Britain | Nov. 4, 1953 |

OTHER REFERENCES

Ser. No. 194,754, Rabe (A.P.C.), published May 25, 1943.

Article: "Fleet Built Plastic Bodies Can Take It," page 82, Commercial Car Journal, February 1954.